United States Patent [19]

Hahn et al.

[11] 4,443,150
[45] Apr. 17, 1984

[54] RELEASABLE LOCKING DEVICE

[75] Inventors: Norbert Hahn, Cudahy; Steven J. Hipp, Milwaukee; Michael A. Swessel, Cudahy, all of Wis.

[73] Assignee: Rite-Hite Corporation, Milwaukee, Wis.

[21] Appl. No.: 321,044

[22] Filed: Nov. 13, 1981

[51] Int. Cl.³ .............................................. B65G 69/00
[52] U.S. Cl. ................................................... 414/401
[58] Field of Search ...................... 414/396, 401, 584; 14/71.1

[56] References Cited

U.S. PATENT DOCUMENTS

| | | | |
|---|---|---|---|
| 4,208,161 | 6/1980 | Hipp et al. | 414/401 |
| 4,264,259 | 4/1981 | Hipp | 414/401 |
| 4,267,748 | 5/1981 | Grunewald et al. | 414/401 X |
| 4,282,621 | 8/1981 | Anthony et al. | 414/401 X |
| 4,373,847 | 2/1983 | Hipp et al. | 414/401 |

*Primary Examiner*—Robert G. Sheridan
*Attorney, Agent, or Firm*—Neuman, Williams, Anderson & Olson

[57] ABSTRACT

A device is provided for releasably securing a parked vehicle to an adjacent structure. The device includes a carriage first section affixed to the adjacent structure and a vertically adjustable carriage second section mounted on the first section and biased to assume a predetermined elevated position. The second section moves downwardly from the elevated position upon a predetermined external force being exerted thereon. A first element is mounted on the carriage second section for relative movement between an operative vehicle-locking mode and an inoperative vehicle-release mode. A second element is adjustably mounted on and substantially concealed by the carriage second section and coacts therewith and the first element to retain the latter in an operative mode. A manually actuated third element is carried on the carriage second section and is movable independently thereof to effect movement of the first element from the inoperative mode to the operative mode. The third element normally assumes a substantially concealed position within the carriage second section. A manually actuated fourth element is adjustably mounted on the carriage second section and is engageable with the second element to effect movement of the latter to a non-retaining position with respect to the first element, when the fourth element is manually activated in one relative direction.

9 Claims, 10 Drawing Figures

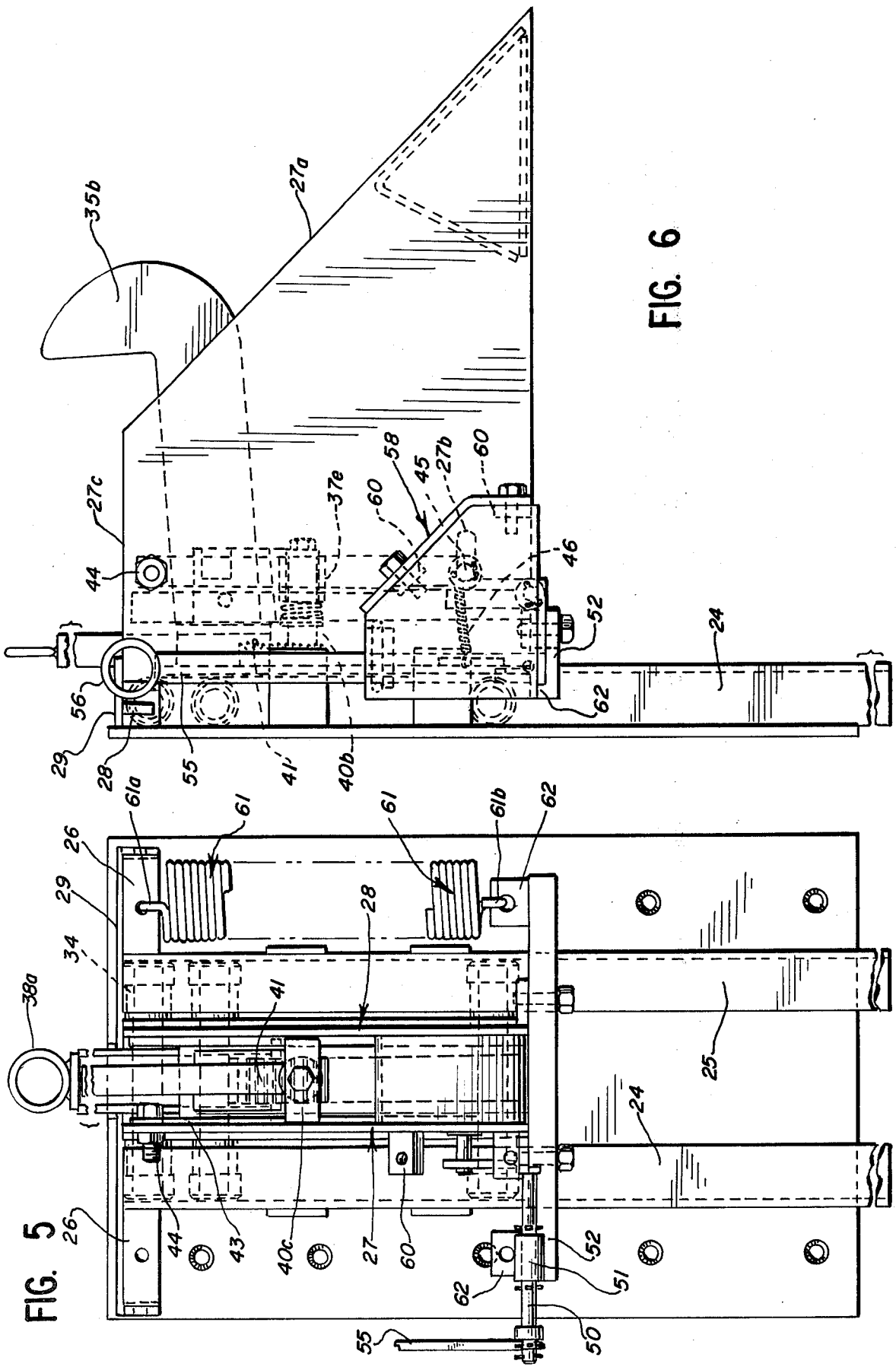

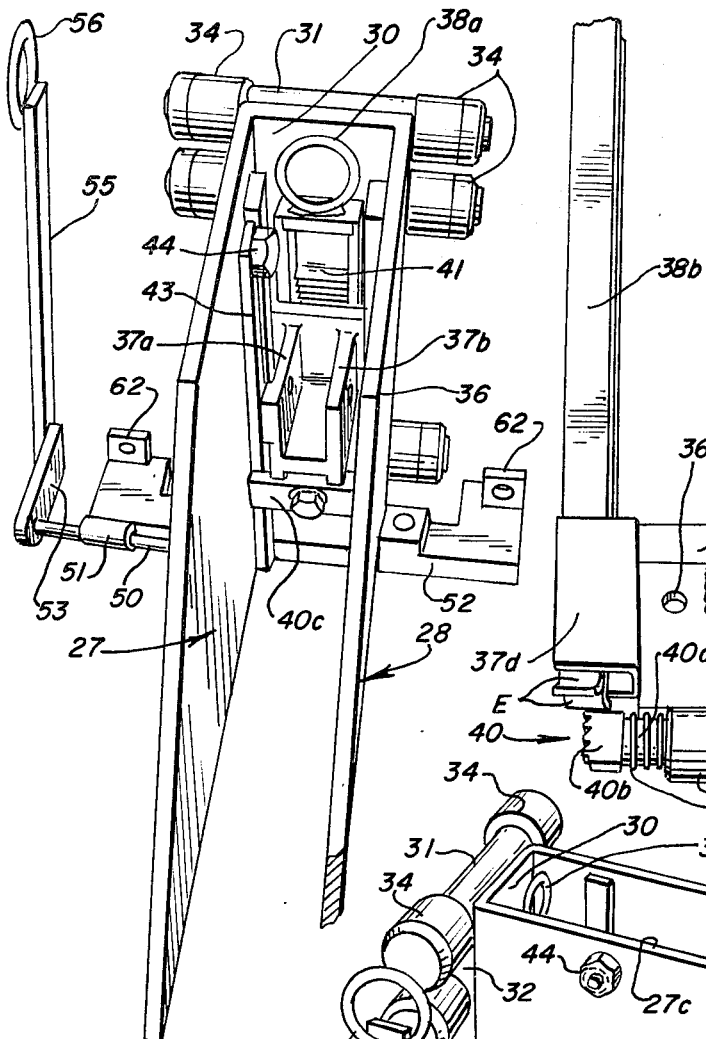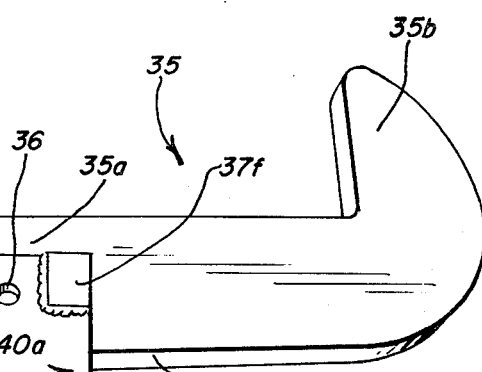

RELEASABLE LOCKING DEVICE

BACKGROUND OF THE INVENTION

In loading and unloading of trucks and/or trailers parked at a loading dock, it has been found that unless the truck or trailer is effectively secured in place, serious accidents and mishaps to both personnel and equipment can occur by reason of the vehicle accidentally or prematurely moving away from the dock.

Various ways to cope with this problem have heretofore been employed, such as, for example, wedging of blocks in front of the vehicle wheels; utilizing taut cable or chain to positively secure the vehicle to the front of the dock; or utilizing manually, electrically and/or hydraulically actuated locking devices mounted on the front of the dock or on the roadway adjacent the dock. Such approaches to cope with the aforementioned problem, however, are beset with one or more of the following shortcomings: (a) the blocks are susceptible to being lost, vandalized, or damaged; (b) the effectiveness of the blocks is seriously impaired when the roadway supporting the vehicle is subjected to ice, snow, rain, oil or grease spills; (c) the effectiveness of the blocks, chains, or cables is dependent primarily upon the conscientious effort exerted by the driver of the vehicle and not upon the dock personnel responsible for loading or unloading of the vehicle; (d) the locking device is of costly and complex construction and is highly susceptible to malfunction due to changes in weather or being struck by the vehicle when the latter is being maneuvered into a parked position; and (e) the locking device is awkward and difficult to operate and/or install.

SUMMARY OF THE INVENTION

Thus, it is an object of the invention to provide an improved locking device which avoids all of the aforenoted shortcomings.

It is a further object to provide an improved locking device which is of sturdy, compact construction and may be readily installed on new or existing loading docks.

It is a still further object to provide an improved locking device which is readily capable of accommodating vehicles which vary in size and configuration over a wide range.

It is a still further object to provide an improved locking device which may be readily manipulated by a person safely located out of the way of the vehicle being parked.

Lastly, it is an object to provide an improved locking device which is able to withstand abusive treatment and will effectively prevent the parked vehicle from being prematurely driven away from the loading dock.

Further and additional objects will appear from the description, accompanying drawings, and appended claims.

In accordance with one embodiment of the invention, an improved device is provided for releasably securing a parked vehicle to an adjacent structure. The device includes a carriage having a first section fixedly attached to the adjacent structure and a second section adjustably mounted on the first section for movement relative thereto in a substantially vertical direction. The second section is biased to normally assume a predetermined elevated position relative to the first section. Mounted on the carriage second section is a hooklike member which is movable relative thereto between an operative vehicle-locking mode and an inoperative vehicle-release mode. Mounted on and substantially concealed by the carriage second section is a composite lock unit having one portion disposed on the carriage second section and an adjustable complemental second portion mounted on the hooklike member. The complemental portions of the lock unit are adapted to coact with one another and releasably retain the hooklike member in the operative mode. A manually activated lift unit is mounted on the carriage second section and is selectively movable independently thereof to effect relative movement of the hooklike member from the inoperative mode to the operative mode. The lift unit normally assumes a retracted position wherein it is substantially concealed within the carriage second section. The lift unit effects movement of the hooklike member to the operative mode only when said unit is pulled upwardly a predetermined amount. A manually actuated release mechanism is adjustably mounted on the carriage second section and, when manually activated in one relative direction, engages and moves one lock unit complemental portion so that the latter assumes a non-retaining position with respect to the hooklike member.

DESCRIPTION

For a more complete understanding of the invention reference should be made to the drawings, wherein:

Fig. 1 is a fragmentary perspective front view of one form of the improved locking device shown mounted on the front wall of a loading dock and with no vehicle shown parked adjacent thereto; for purposes of illustration and better understanding of the device, the carriage second section is shown in its normal elevated position with the hooklike member in an inoperative mode, and with the lift unit being engaged by one end of a rodlike implement so as to enable the hooklike member to be manually moved to its operative mode.

FIG. 5 is an enlarged fragmentary front elevational view of the device of FIG. 4 and with a portion of the hooklike member removed.

FIG. 6 is an enlarged fragmentary left side elevational view of FIG. 5.

FIG. 7 is a fragmentary perspective front view of the carriage second section disassembled from the carriage first section.

FIG. 8 is an enlarged fragmentary perspective bottom view of the hooklike member, a portion of the lock unit and a segment of the lift unit.

FIG. 9 is an enlarged fragmentary left-hand view of the hooklike member and lift unit shown in FIG. 8.

FIG. 10 is an enlarged fragmentary perspective left side view of the carriage second section per se with a protective housing therefor removed so as to expose various components of the release mechanism.

Figure 1:
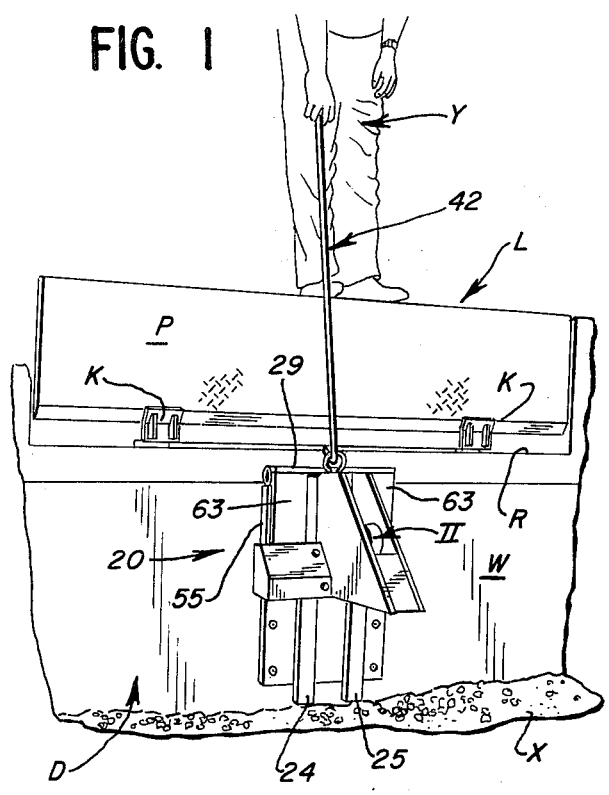

Referring now to the drawings and more particularly to FIGS. 1-4, one embodiment of the improved releasable locking device 20 is shown mounted on the front wall W of a conventional loading dock D. The dock, as shown, is provided with a dock leveler L which may be of a type disclosed in U.S. Pat. No. 4,110,860. The dock leveler is normally disposed within a pit or recess R formed in the dock with the front side of the pit terminating at the front wall of the dock. As seen in FIGS. 1-4, the dock leveler includes a lip P which is hingedly mounted on the front edge of a deck, not shown, the latter forming a component of the dock leveler. The lip P is adapted to assume an extended position wherein it spans the gap which normally occurs between the rear end of the parked vehicle, not shown, and the front edge of the deck during the loading or unloading operation. When the dock leveler is in an inoperative mode, the exposed surface of the deck is substantially coplanar with the horizontal supporting surface of the dock, and the lip P assumes a downwardly extending vertical inoperative position as shown. The lower edge of the depending lip is accommodated and supported by a plurality of horizontally spaced keepers K which are fixedly mounted adjacent the front wall W of the dock. The dock leveler construction, heretofore described, forms no part of the instant invention. The improved releasable locking device 20 may, if desired, be mounted on the front wall of a dock wherein no dock leveler is provided.

The device 20 is positioned between the leveler L and the roadway X on which the vehicle is parked and includes a fixedly mounted carriage first section 21 and a carriage second section 22 mounted on the first section for substantially vertical adjustment relative thereto.

The carriage first section 21 in the illustrated embodiment includes an elongated substantially planar mounting plate 23 which is bolted or otherwise affixed to the front wall W of the dock D. As shown, the plate 23 is disposed beneath the pit R and substantially equidistant from the side walls thereof. The lower edge of plate 23 may engage or be closely adjacent to the roadway X.

Figure 3:
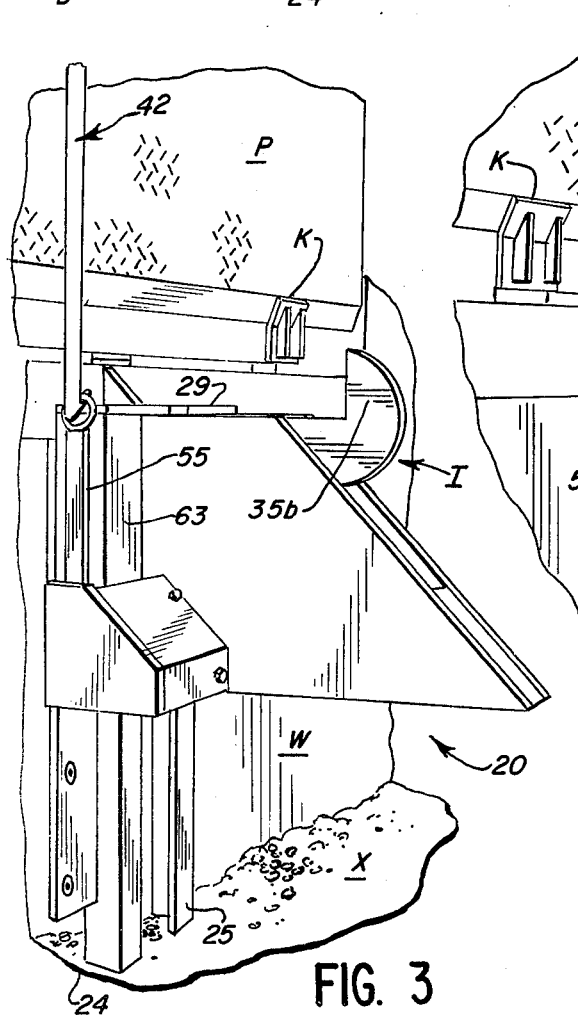
FIG. 3 is an enlarged fragmentary perspective side view with the hooklike member in its operative mode and the rodlike implement engaging a release mechanism carried on the carriage second section.
Figure 4:
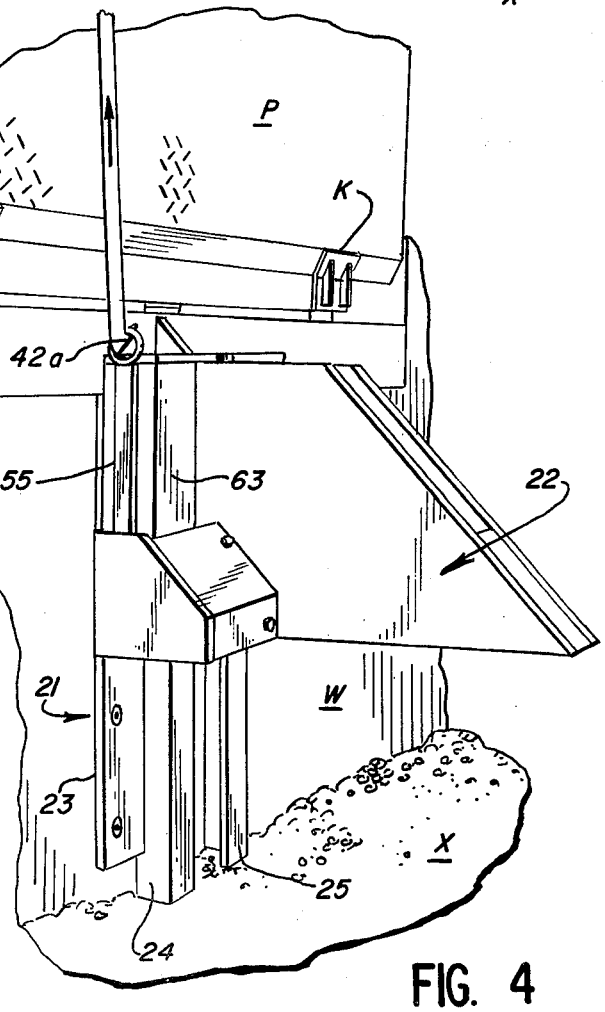
FIG. 4 is similar to FIG. 3 but showing the release mechanism being activated upwardly by the rodlike implement whereby the hooklike member has assumed its inoperative mode.

Mounted on the exposed surface of the mounting plate 23 are a pair of spaced, parallel, vertically extending guideways 24, 25, see FIGS. 3, 4. Affixed to the upper ends of the guideways 24, 25 and projecting laterally in opposite directions therefrom is a bracket 26, see FIG. 5. The function of the bracket will be described more fully hereinafter. In addition to bracket 26, the upper ends of the guideways are closed by a fixedly mounted flange piece 29.

The carriage second section 22 is shown more clearly in FIG. 10 and includes a pair of outwardly projecting, substantially parallel, vertically extending plate members 27, 28. The corresponding edges of the plate members, adjacent the carriage first section 21, are interconnected by a bail or web portion 30.

Affixed to the web portion 30 and arranged in vertically spaced relation are a plurality of laterally extending guides 31, 32, 33. The outer ends of each guide are provided with suitable rollers 34 or the like which are accommodated within and engage the guideways 24, 25 of the carriage first section 21. The relative positions of the guides 31-33 maintain the second section 22 in a stable condition as it moves vertically relative to the first section 21, as will be discussed more fully hereinafter.

Figure 2:
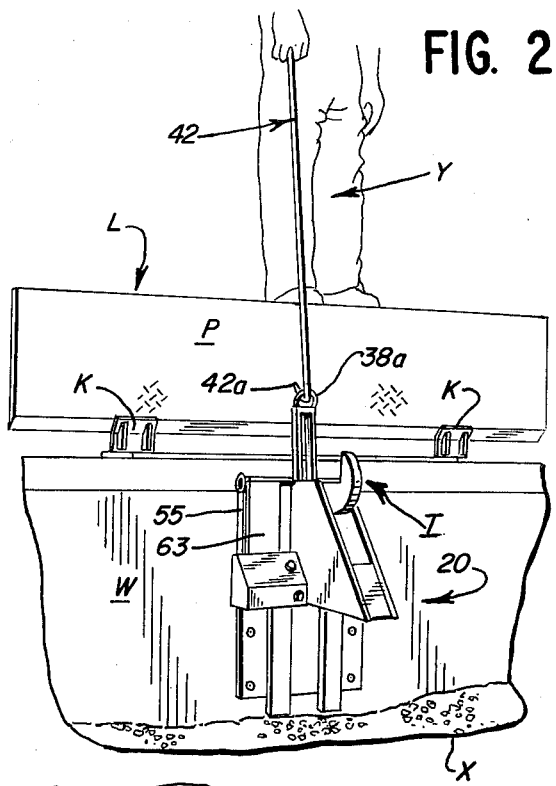
FIG. 2 is similar to FIG. 1 but showing the lift unit manually pulled upwardly the full amount by the rodlike implement and showing the hooklike member disposed in an operative mode.

Positioned between the plate members 27, 28 is a hooklike member 35, see FIG. 8, which is movable relative thereto between an operative vehicle-locking mode I, FIGS. 2, 3 and an inoperative vehicle-release mode II, FIGS. 1, 4. When in the inoperative mode the hooklike member 35 is substantially concealed between the plate members 27, 28. Member 35 has the inner end 35a thereof connected by a shear pin 36 to a slide piece 37, see FIG. 8. The outer distal end 35b of member 35 extends upwardly at approximately ninety degrees and is adapted to engage behind the crosspiece of a conventional ICC bar, not shown, of the parked vehicle. Such a bar is required by most governmental regulation and depends from the rear end of the bed of the parked vehicle. When engaged by member 35, the crosspiece of the ICC bar is captured between the distal end 35b and the front wall W of the dock D thereby preventing the parked vehicle from accidentally moving away from the dock before the loading or unloading operation is completed.

Because the height of the ICC bar crosspiece above the roadway X oftentimes varies several inches, it is necessary that the height of the hooklike member must also vary when in its operative mode I so that the member 35 will securely engage the crosspiece. To permit the necessary height variations of member 35, when it is in the operative mode I and thus, compensate for the height differences of the crosspiece, the carriage second section 22 is capable of being moved in a vertical plane relative to the fixed carriage first section 21.

To enable the second section 22 to be moved the appropriate amount, the corresponding upper, outer edge portions 27a, 28a of the plate members 27, 28 are inclined downwardly a like amount forming a cam surface, see FIGS. 1-4, 10 so that when the vehicle is being maneuvered into the appropriate parked position, the crosspiece of the ICC bar will engage edge portions 27a, 28a forming the carriage second section 22 downwardly as the vehicle continues to back towards the dock. The vehicle will have assumed the required parked position when the back end of the vehicle bed has engaged bumpers, not shown, normally mounted on the dock wall W adjacent opposite sides of the dock leveler. The bumpers project outward from the dock wall so that the rear end of the vehicle will not damage the locking device 20, the lip P of the dock leveler L, or the dock itself. The carriage second section 22 extends outwardly beyond the bumpers so that the ICC bar crosspiece will slidably engage the inclined edges 27a, 28a and move relative thereto a sufficient amount so that the distal end 35b of the hooklike member 35 will be properly located with respect to the crosspiece.

Vertical adjustment of the carriage second section 22 is also important to compensate for variations in the weight of the load supported by the vehicle bed as the latter is subjected to loading or unloading.

The slide piece 37, to which the end 35a of the hooklike member 35 is connected, includes a pair of spaced substantially parallel, rigid flange segments 37a, 37b (see FIG. 7) between which the end 35a of member 35 is adapted to be snugly positioned when the member and slide piece are in assembled condition. The lower portions of the flange segments are interconnected by a cross segment; the latter contacts the underside 35c of member end 35a and thus, maintains the hooklike member 35 in a predetermined outwardly extending position.

Affixed to the inner edges of flange segments 37a, 37b is a rearwardly facing substantially channel section 37d which functions as a substantially vertical guide for an independently adjustable, elongated lift member 38, the latter to be discussed in greater detail hereinafter.

Mounted on the underside of flange segments 37a, 37b is a depending bracket 37e on which is mounted a first jaw unit 40. The unit includes a spring biased piston 40a having a jaw 40b affixed to an exposed end of the piston. The piston projects inwardly towards the carriage first section 21. Affixed to and extending laterally from the opposite end of the piston 40a is a lug 40c, the function of which will become apparent hereinafter. The jaw 40b is provided with a serrated surface which is adapted to frictionally engage an elongated vertically extending ratchet 41. The ratchet is fixedly mounted on the outwardly facing surface of the web portion 30 which interconnects plate member 27, 28. The ratchet 41 has a complemental serrated surface and the serrations of jaw 40b are adapted to automatically interlock therewith thereby retaining the hooklike member 35 in its operative mode I. The shape of the serrations are such that the hooklike member 35 can be readily raised from the inoperative mode II to the operative mode I by an upward pulling force being manually applied to the lift member 38. To facilitate the application of the required pulling force, an elongated rodlike implement 42 may be utilized, which has a laterally extending finger 42a formed at one end thereof. The finger, as seen in FIG. 2, may be inserted through a loop or opening 38a formed at the upper end of the lift member 38.

The opposite or upper end of the implement 42 may be provided with a suitable handle so as to facilitate manipulation of the implement when engaging or disengaging the finger 42a with the lift member loop 38a.

As seen in FIGS. 1 and 2, the implement 42 can be manipulated by a person Y standing on the deck of the dock leveler adjacent the hinge axis of the lip P. Because the rear end of the parked vehicle is spaced away from the dock front wall W by the bumpers, heretofore mentioned, there is sufficient spacing provided to allow the implement to be readily manipulated.

The lift member 38, as illustrated in FIG. 9, has a fork-like configuration and includes a pair of elongated substantially parallel depending leg segments 38b, 38c. The spacing between the leg segments is such that they slidably straddle the jaw 40b and are disposed between the flanges of the channel section 37d, see FIG. 9. The lower ends E of the leg segments 38b, 38c are flared outwardly in opposite directions so that when the lift member 38 is pulled upwardly a predetermined amount by implement 42, the ends E will engage the lower edges of the channel section flanges and upon a continued upward pull being exerted on the lift member 38, the hooklike member 35 and jaw unit 40 will move upwardly as a unit relative to the carriage second section 22, until the distal end 35b of the member 35 has interlockingly engaged the ICC bar crosspiece of the parked vehicle.

The upper ends of the leg segments 38b, 38c are interconnected by a cross segment 38d from which the loop 38a projects. When the loop is released from the implement 42 after the hooklike member has assumed its operative mode, the lift member 38 will automatically move downwardly (retract) by the force of gravity until the cross segment 38d engages the upper surface of jaw 40b. The channel section 37d and the jaw 40b coact with one another to provide guides for the leg segments 38b, 38c of the lift member as the latter moves relative to the hooklike member 35.

As seen in FIG. 8, the jaw 40b is biased toward the ratchet 41 by a coil spring 40d having one end thereof engaging the jaw and the opposite end engaging the bracket 37e.

In order to effect disengagement between the jaw 40b and ratchet 41, an elongated bar 43 is provided which is pivotally mounted at 44 to the interior surface of plate member 27, see FIG. 7. The bar depends from the pivot axis 44 and extends to one side of bracket 37e and behind the lug 40c, the latter being mounted on and movable with the piston 40a. A spacer pad 37f, see FIGS. 7 and 8, is provided on one side of slide piece 37. The pad slidably engages an adjacent surface of bar 43, as the slide piece 37 moves as a unit with the hooklike member 35. The length of bar 43 is greater than the distance the member 35 travels when moving between its operative and inoperative modes.

Affixed to the lower end of bar 43 and extending transversely therefrom through a slot 27b, formed in plate member 27, is a pin 45, see FIG. 10. The distal end of pin 45 is exposed and has connected thereto one end of a coil spring 46. The opposite end of the spring is attached to a spur 47 affixed to and projecting from the exposed surface of plate member 27. The spring 46 exerts a pulling force on the pin 45, causing the lower end of bar 43 to be pivoted inwardly towards the channel section 37d.

Engaging the exposed end of pin 45 is an upright arm 48 which has the lower end thereof affixed to a transversely extending shaft 50. The shaft is supported by a bearing 51 provided on a bracket 52 which is affixed to and extends sidewise in both directions from the underside of plate members 27, 28, see FIGS. 5, 10. The shaft 50 is supported so as to rotate about its longitudinal axis.

Keyed or otherwise affixed to the outer end of shaft 50 is one end of a lever 53. The opposite end of the lever is pivotally connected at 54 to the lower end of an upwardly extending release bar 55. The upper end of bar 55 is provided with an upwardly projecting loop or opening 56. The top of the loop 56 is normally in a position which is approximately in a plane defined by the upper edge portions 27c, 28c of plate members 27, 28, see FIG. 6.

Bar 55 slidably extends through a stirruplike guide 57 affixed to the interior of a protective cover 58 which is removably attached to a plurality of supporting brackets 60 protruding from the exposed surface of plate member 27, see FIG. 10.

When jaw 40b is to be disengaged from the ratchet 41 so as to enable the hooklike member 35 to automatically return to its inoperative vehicle-release mode II, the loop 56 of bar 55 is engaged by the finger 42a of implement 42 and an upward pull of predetermined magnitude is exerted thereon. As bar 55 moves upwardly, a clockwise turning force is imparted to shaft 50 whereupon arm 48 overcomes the bias of both springs 46 and 40d and swings the lower end of bar 43 outwardly against lug 40c causing the latter and the piston 40a and jaw 40b attached thereto to move outwardly relative to bracket 37e whereby jaw 40b becomes disengaged from the ratchet 41. Once the loop 56 is disengaged from the finger 42a of the implement 42, the bar 55 will move downwardly due to the force of gravity and the bias of springs 46, 40d.

The carriage second section 22 is biased so as to normally assume a predetermined elevated position with respect to the roadway surface X, see FIGS. 1 and 2. The height of the elevated position is such that the crosspiece of the ICC bar of the vehicle, as the latter is being backed into a parked position, will slidably engage the cam surface defined by the inclined edge portions 27a, 28a of the plate members 27, 28. As the vehicle continues its backing motion, a predetermined downward force component is exerted on the cam surface causing the carriage second section 22 to move downwardly. Normally when the vehicle is in its parked position and abutting the bumpers, the ICC bar crosspiece will rest upon the upper edge portions 27c, 28c of the plate members 27, 28.

The upward bias for the carriage second section 22, in the illustrated embodiment, is provided by a pair of heavy duty coil springs 61 disposed laterally from the plate members 27, 28. The upper ends 61a of the springs 61 are connected to the opposite end portions of the laterally extending bracket 26 which is affixed to the upper ends of the guideways 24, 25 provided on the stationary carriage first section 21.

The lower ends 61b of the springs 61 are connected to upwardly extending stubs 62. The stubs 62 are carried by portions of bracket 52, which extend laterally outwardly from the underside of plate members 27, 28. The coil springs 61 are positioned adjacent to, but spaced from, the corresponding guideways 24, 25. One of the springs 61 is positioned between the release bar 55 and the guideway 24 and rearwardly of the shaft 50. Each of the springs 61 is enclosed within an elongated protective shield 63. The shields may be affixed at their upper ends to the laterally extending portions of bracket 26. The shields extend downwardly through an open top of the cover 58.

Besides allowing the carriage second section 22 to move downwardly relative to the first section 21 so as to compensate for the variations in height of the ICC bar crosspiece on various types of vehicles, the bias springs 61 permit the carriage second section as previously mentioned to compensate for the vertical movement of the crosspiece due to weight changes of the load carried on the bed of the vehicle during the loading and unloading operations.

As aforementioned, the hooklike member 35, when in the inoperative mode, is concealed between the plate members 27, 28. In addition the jaw unit 40 and its various components and the lift member 38, when in its retracted position, are also concealed between the plate members regardless whether member 35 is in its operative or inoperative mode. Thus, by being concealed between the plate members, the susceptibility of the unit 20 being damaged by a moving vehicle has been significantly reduced. Furthermore, by reason of such a structural arrangement, the improved locking device can have greater compactness without sacrificing the overall strength and stability of the device.

Thus, it will be noted that a releasable locking device has been disclosed which is compact; easily installed on the front wall of a loading dock; and does not rely on any electrical, hydraulic and/or pneumatic power sources to effect operation of the device. The device is not adversely affected by severe climatic conditions and is capable of accommodating vehicle ICC bars which vary in size and location over a wide range.

We claim:

1. A releasable locking device for securing a parked vehicle to an adjacent structure, said device comprising a carriage having a first section adapted to be affixed to the adjacent structure, and a second section mounted on said first section and biased to assume a predetermined elevated position, said second section being movable downwardly from said elevated position upon an external force of a predetermined magnitude being exerted on said second section; a first means mounted on said carriage second section for relative rectilinear movement with respect thereto between an operative vehicle-locking mode and an inoperative vehicle-release mode; releasable second means mounted on and substantially concealed by the carriage second section and coacting therewith and said first means for retaining the latter in said operative mode; manually actuated third means carried on said carriage second section and movable independently thereof between extended and retracted positions, when moving from a retracted position to an extended position said third means effecting relative movement of said first means from said inoperative mode to said operative mode, said third means normally assuming a retracted position and being substantially concealed within said carriage second section; and manually actuated fourth means adjustably mounted on said carriage second section and engageable with said second means to effect movement of the latter to a non-retaining position with respect to said first means, when said fourth means is manually actuated in one relative direction.

2. The releasable locking device of claim 1 wherein the second means is spring biased to effect automatic retaining of the first means in the operative mode.

3. The releasable locking device of claim 2 wherein the second means includes a first lock component fixedly mounted on and substantially concealed by the carriage second section and a spring biased second complemental lock component carried on said first means and being substantially concealed by said carriage second section, said lock components normally being in interlocking relation when said first means is in said operative mode.

4. The releasable locking device of claim 1 wherein an external upward manual pull of predetermined magnitude exerted upon said third means effects movement of said first means from said inoperative mode to said operative mode.

5. The releasable locking device of claim 1 wherein an external upward manual pull of predetermined magnitude exerted upon said fourth means effects movement of said second means to said non-retaining position.

6. The releasable locking device of claim 4 or 5 wherein the third and fourth means are each provided with an exposed attachment element for selective engagement by a manually manipulated implement to impart an upward pulling force thereto.

7. The releasable locking device of claim 6 wherein the third means normally assumes a retracted position relative to the carriage second section and assumes an extended position when effecting movement of said first means from an inoperative mode to an operative mode; the attachment element of said third means being exposed when the latter is in either the retracted or extended position.

8. The releasable locking device of claim 7 wherein the attachment element is adapted to be selectively engaged and disengaged by one end of an elongated rodlike implement.

9. The releasable locking device of claim 7 wherein the third means includes a pair of elongated depending members arranged in spaced substantially parallel relation and having upper end portions thereof interconnected and provided with an attachment element, said third means being disposed in a sliding straddling relation with a portion of said first means, said elongated members having lower end portions in force-transmitting relation with said first means upon said third means assuming a predetermined extended position with respect to said carriage second section.

* * * * *

UNITED STATES PATENT AND TRADEMARK OFFICE
CERTIFICATE OF CORRECTION

PATENT NO. : 4,443,150
DATED : April 17, 1984
INVENTOR(S) : NORBERT HAHN, STEVEN J. HIPP and MICHAEL A. SWESSEL It is certified that error appears in the above-identified patent and that said Letters Patent is hereby corrected as shown below:

Column 4, line 40, "forming" should be --forcing--.

Signed and Sealed this

Thirtieth Day of October 1984

[SEAL]

Attest:

Attesting Officer

GERALD J. MOSSINGHOFF
Commissioner of Patents and Trademarks